United States Patent [19]

Poppel et al.

[11] Patent Number: 5,792,504
[45] Date of Patent: Aug. 11, 1998

[54] PROCESS FOR PRODUCING AN EMULSION PRODUCT HAVING A MEAT-LIKE APPEARANCE

[75] Inventors: Gerhard J. Poppel, St. Joseph; Michael G. Rayner, Agency; Michael J. Saylock, Kansas City, all of Mo.

[73] Assignee: Nestec S.A., Vevey, Switzerland

[21] Appl. No.: 675,736

[22] Filed: Jul. 3, 1996

[51] Int. Cl.[6] .................. A23J 3/04; A23J 3/14; A23L 1/317
[52] U.S. Cl. .............. 426/646; 426/656; 426/657; 426/802; 426/805
[58] Field of Search .................... 426/646, 656, 426/657, 512, 513, 805, 802

[56] References Cited

U.S. PATENT DOCUMENTS

| | | |
|---|---|---|
| 3,653,908 | 4/1972 | Buck et al. |
| 3,898,345 | 8/1975 | Horrocks et al. ............ 426/274 |
| 3,982,004 | 9/1976 | Obata et al. ................ 426/641 |
| 4,450,183 | 5/1984 | Steinberg et al. ........... 426/646 |
| 4,643,908 | 2/1987 | Sawhill ...................... 426/630 |
| 4,781,939 | 11/1988 | Martin et al. ............... 426/646 |
| 5,132,137 | 7/1992 | Reimann et al. ............ 426/513 |

FOREIGN PATENT DOCUMENTS

| | | |
|---|---|---|
| 0651948A1 | 5/1995 | European Pat. Off. |
| 142144 | 3/1979 | Germany. |
| 52-148642 | 12/1977 | Japan. |
| WO92/18018 | 10/1992 | WIPO. |

*Primary Examiner*—Arthur L. Corbin
*Attorney, Agent, or Firm*—Hill & Simpson

[57] ABSTRACT

A process for the production of a formulated emulsion product which has a meat-like appearance. A protein source is emulsified and then alkali is added to the emulsion to raise the pH to above 8. The emulsion is rapidly treated in an emulsion mill to causes the protein in the heated emulsion to at least partially coagulate. The heated emulsion is then allowed to coagulate and form striations and is cut into chunks. The formulated emulsion product so produced contains about 45% to 85% by weight moisture and has a chewy texture and a high striated appearance.

9 Claims, 1 Drawing Sheet

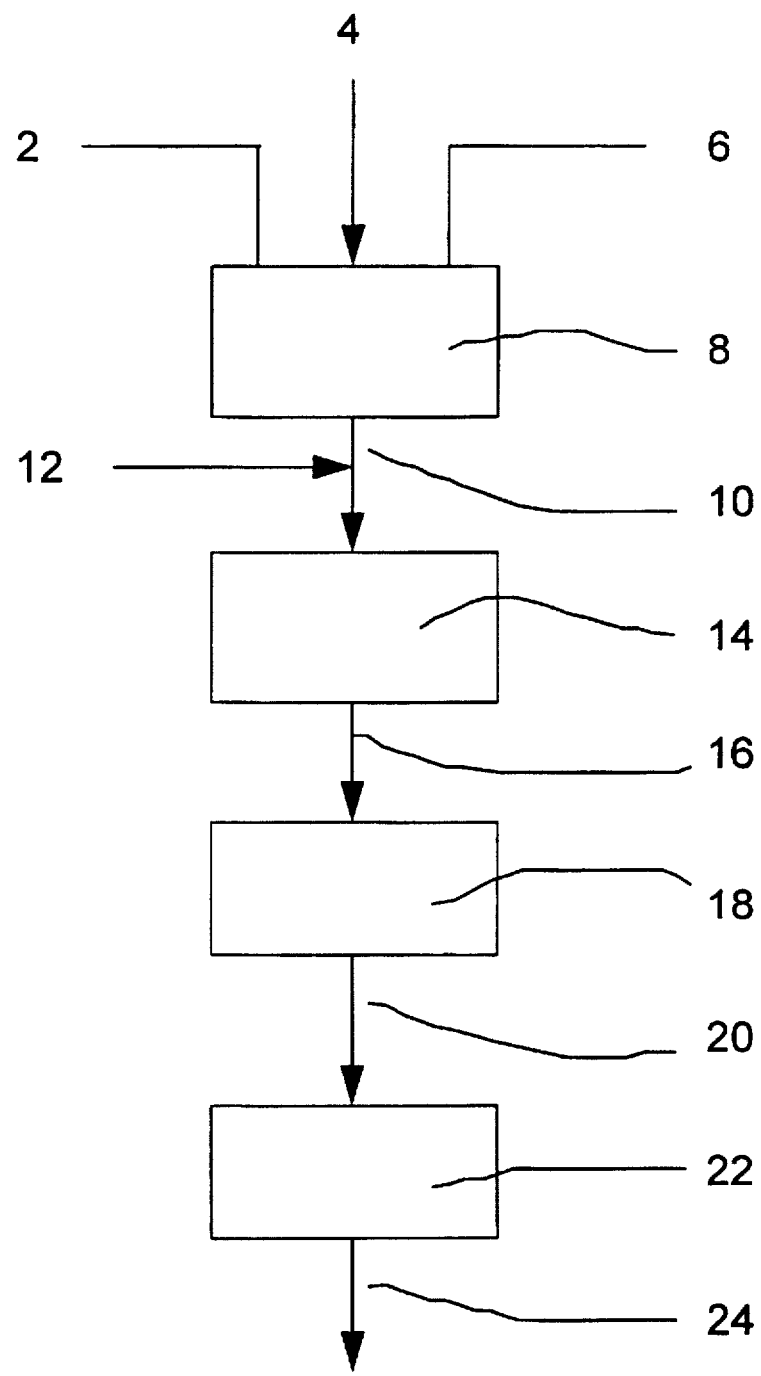

PROCESS FOR PRODUCING AN EMULSION PRODUCT HAVING A MEAT-LIKE APPEARANCE

FIELD OF THE INVENTION

This invention relates to a process for the production of a formulated emulsion product which has a meat-like appearance. The invention also relates to products so produced. The formulated emulsion products are particularly suitable for use as pet foods.

BACKGROUND TO THE INVENTION

Coagulated meat emulsions, in the form of loaf-like products, are commonly used as pet foods because they are easily manufactured, readily digested by the animals, very palatable to the animals, and are readily formulated to contain necessary nutrients and trace elements. A disadvantage is that these coagulated emulsions do not have a striated and chunky meat-like appearance. However, for pet foods, a meat-like appearance can greatly enhance consumer acceptability.

A formulated meat emulsion which has a meat-like appearance is described in U.S. Pat. No. 4,781,939. This formulated meat emulsion is produced by first forming a meat emulsion from a meat source. Dry ingredients such as dry proteinaceous materials (for example wheat gluten, soy flour), vitamins, minerals and the like are then mixed into the meat emulsion to provide a viscous emulsion. The viscous emulsion is then run through a high-speed emulsion mill in which the emulsion is rapidly heated to a temperature in the range of 102° C. to 118° C. The emulsion leaving the emulsion mill is fed to a holding tube where the protein in the emulsion coagulates to form a solid emulsion product. This solid emulsion product is then formed into chunks. The chunks are highly striated and resemble natural meat chunks in appearance and texture.

The product produced by the process has been successfully used in pet foods for many years. However in recent times, mainly to reduce costs, there has been a move to increase the moisture content of the meat emulsions. However, if the amount of moisture becomes too high, the emulsion is not viscous enough to form acceptable chunks. Consequently proteinaceous materials must be added to the emulsion prior to forming into chunks.

A similar process is disclosed in U.S. Pat. No. 5,132,137. However, in this process the viscous emulsion is heated to a temperature of 40° to 70° C. in the emulsion mill; which is much lower than that in the process disclosed in U.S. Pat. No. 4,781,939. The heated emulsion takes longer to coagulate and is therefore held in a holding tube for a longer time. The emulsion is then formed into strands and baked in an oven at a core temperature of 70° to 95° C. The patent is deficient in specific teaching of the contents of the emulsion but it is very likely that proteinaceous components such as gluten would be needed and that the moisture content would need to be low. This is particularly so since only partial coagulation occurs in the emulsion mill.

Therefore there is a need for a process of producing a formulated emulsion product which has a meat-like appearance and texture and yet which may have a higher moisture content.

SUMMARY OF THE INVENTION

In one aspect, this invention provides a process for the production of a formulated emulsion product which has a meat-like appearance, the process comprising:

emulsifying a protein source for providing an emulsion;

adding alkaline to the emulsion to raise the pH to above about 8;

rapidly heating and comminuting the emulsion using mechanical energy for causing protein in the heated emulsion to at least partially coagulate;

allowing the heated emulsion to coagulate and form striations; and forming the coagulated emulsion into chunks for providing a formulated emulsion product.

Surprisingly, it is found that the addition of the alkaline greatly increases the viscosity of the emulsion and permits the production of a formulated emulsion product of higher moisture content. Also, if desired, components such as gluten may be reduced in amount or omitted entirely. Further, the emulsion need not be produced from a traditional meat source; instead an animal protein source such as plasma, blood proteins, whey, or casein may be used. Consequently, a formulated emulsion product with a meat-like appearance may be produced at lower cost.

Further, it is also surprisingly found that the formulated emulsion product has much thinner and more pronounced layers giving it a highly striated and more meat-like appearance. Also the product has an improved, chewy texture.

The protein source may be of animal or vegetable origin, or a mixture of both. Conveniently the protein source may comprise at least about 80% by weight of animal protein; the remaining protein being of vegetable origin. For example, the protein in the emulsion may comprise about 95% to 100% by weight of protein of animal origin. Alternatively, the protein in the emulsion may comprise about 95% to 100% by weight of protein of vegetable origin.

The alkaline which is added to the emulsion may be any suitable alkaline which is acceptable in food. For example, the alkaline may be NaOH, KOH or $Ca(OH)_2$, or mixtures thereof. Preferably, however, the alkaline is NaOH. Preferably sufficient alkaline is added to raise the pH of the emulsion to a range of about 9 to about 12; for example about 9 to about 11. This amount preferably results in the formulated emulsion product containing less than about 5% by weight alkaline; more preferably less than about 2% by weight.

The formulated emulsion product preferably has a moisture content of about 45% to about 85% by weight; more preferably about 55 to about 65% by weight. If necessary water may be added up to an amount of about 60% by weight to obtain this level of moisture. However, if the protein source contains sufficient moisture, the addition of further moisture is not necessary. Additional ingredients such as fats, sugars, salts, spices, seasonings, flavorants, minerals, and the like may also be added to the emulsion. The amount of additional ingredients used is preferably such that they make up about 1% to about 35% by weight of the formulated emulsion product.

The protein source may include whey. This embodiment has the advantage that sugars in the whey may react with amino acids in the emulsion. The Maillard reaction products which result provide the chunks with "meaty" flavor notes which may increase palatability.

The alkaline may be added to the emulsion during emulsification of the protein source, or may be added to the emulsion immediately prior to the heating and comminuting of the emulsion, or may be added to the emulsion during the heating and comminuting of the emulsion. Preferably, the emulsion is deaerated after emulsification.

Preferably the emulsion is rapidly heated and comminuted by forcing the emulsion between a pair of spaced-apart plates; at least one of which is rotating at high speed. If necessary, the emulsion may be further heated by injecting superheated steam into it. Preferably the emulsion is heated to a temperature above about 100° C., for example within the range of about 102° C. to about 120° C. Alternatively, the emulsion may be rapidly heated to a lower temperature providing that the temperature is sufficient to cause at least partial coagulation of the protein; for example at least to about 45° C.

The heated emulsion is preferably allowed to coagulate and form striations for a time in the range of about 30 seconds to about 10 minutes; more preferably about 1 minute to about 6 minutes.

The invention also provides a formulated emulsion product produced by the process defined above.

In another aspect, this invention provides a formulated, striated emulsion product having a meat-like appearance, the product comprising protein, fats and about 45% to 85% by weight moisture and having a pH of above about 8.

Preferably the formulated emulsion product comprises about 55% to about 65% moisture. Also, the formulated emulsion product preferably has a pH in the range of about 9 to about 12.

The protein content of the formulated emulsion product is preferably about 10 to about 25% by weight; for example about 12 to about 22% by weight. The protein may include whey.

The formulated emulsion product preferably comprises about 5% to about 25% by weight of fat.

Preferably at least about 50% of the striations of the formulated emulsion product have a thickness less than about 50 μm. Further, the formulated emulsion product preferably has an elasticity recovery of greater than about 40%; more preferably greater than about 50%. For example, the formulated emulsion product may have an elasticity recovery of about 55% to about 65%. This provides the product with an excellent chewy texture.

The invention also provides a pet food comprising chunks of a formulated emulsion product as defined above, in combination with an acidic carrier to neutralize the basicity of the chunks. The carrier may be an acidic sauce or gravy, or may be a coagulated meat emulsion.

BRIEF DESCRIPTION OF THE DRAWINGS

Embodiments of the invention are now described, by way of example only, with reference to the drawing which illustrates schematically the process of producing the formulated emulsion product.

DETAILED DESCRIPTION OF THE INVENTION

Referring to the drawing, a protein source 2, water 4 and an additive mixture 6 are mixed together in a mixer 8 to provide a primary emulsion 10. The protein source 2 which is fed to the mixer 8 may be any suitable meat or vegetable protein source, or both.

A suitable meat protein source is a meat emulsion obtained by grinding and then emulsifying blocks of a meat material, such as meat or meat by products. The meat material may be any suitable source of animal protein; for example the muscular or skeletal meat of mammals, poultry, and fish or meat by-products such as hearts, liver, kidneys, tongue and the like. The exact composition may be selected according to cost and the desired flavor. The meat material conveniently may be in frozen form prior to grinding. Suitable procedures for processing frozen blocks of meat material into a meat emulsion mixture are described in U.S. Pat. No. 4,781,939, the disclosure of which is incorporated by reference. Alternatively or in addition, the animal protein source may be in the form of meat meals such as poultry meal, fish meal, and red meat meal; blood proteins; egg solids; casein; plasma; whey and mixtures thereof. Again the exact composition may be selected according to cost and the desired flavor. Mixtures of any of the above may also be used.

Any suitable vegetable protein source may be used; for example grain flours and legume flours, vegetable protein isolates and concentrates, and vegetable proteins. Suitable examples are wheat flours, cottonseed meal, gluten, soy meal, soy protein concentrates and isolates, and mixtures thereof. Preferably however the vegetable protein source contains reduced amounts of starch; for example, less than about 20% by weight of starch. Cottonseed meal, gluten, soy meal, soy protein concentrates and isolates are therefore particularly preferred.

It is particularly preferred to use a protein source which is a mixture of animal and vegetable origin; for example a mixture of meat material, soy protein isolates or concentrates, and gluten. The total amount of protein in the primary emulsion must be such that the protein is able to coagulate to provide a firm emulsion product in a relatively short time; for example in less than 10 minutes. For example, the primary emulsion 10 may contain from 10 to 22% by weight of protein.

If desired, whey may be included in the protein source 2; for example in an amount of about 1% to about 25% by weight of the primary emulsion 10. The whey is conveniently in powder form. The inclusion of the whey has the advantage of providing a source of reducing sugars which may react with amino acids to provide Maillard reaction products. These reaction products may provide flavor notes which can increase the palatability of the formulated emulsion product.

The additive mixture 6 may be a mixture of dry additives or fats; and mixtures thereof. The dry additives may be, for example, sugar, salt, spices, seasonings, vitamins, minerals, flavorants and the like. The fats may be suitable animal fats; for example tallow, or may be vegetable fats. The total amount of the additive mixture used may be selected as required but will usually be in the range of 1 to 35% by weight of the primary emulsion.

The amount of water 4 added is sufficient such that the water comprises from about 45% to 85% by weight in the formulated emulsion product. If sufficient moisture is present in the protein source 2 or the additive mixture 6, the water 4 may be omitted. Usually an amount of water to make up to about 60% of the primary emulsion 10 is added.

In the processes described in U.S. Pat. Nos. 4,781,939 and 5,132,137, the amount of fat in the primary emulsion must be controlled to facilitate processing and to obtain an acceptable product. However the amount of fat is not an important parameter in this process and the amount can be selected as desired. Consequently no fat need be added; particularly if the animal protein source 2 contains fats. Conveniently, the amount of fat in the primary emulsion 10 is in the range of 5% to 25% by weight. Reducing the importance of fat as a parameter in the process is a major advantage of the process.

The protein source 2, the water 4 and the additive mixture 6 are mixed in any suitable mixer 8. For example, a twin screw mixer, a twin ribbon blender, or an overlapping paddle mixer may be used. The mixing should be sufficient to ensure that any dry ingredients are dissolved.

Once mixed, the primary emulsion 10 is preferably fed through a vacuum stuffer (not shown), or similar deaeration apparatus, to deaerate the primary emulsion 10. This removes air which may otherwise cause disruption of the formulated emulsion product and reduce its meat-like appearance. However, it is not essential to deaerate the primary emulsion 10 because, in general, an acceptable product may still be obtained.

Alkali 12 is injected into the primary emulsion 10 prior to the primary emulsion 10 being fed into an emulsion mill 14. Sufficient alkali 12 is injected so as to raise the pH of the primary emulsion 10 to a range of about 8 to about 12. The alkali may be any alkali suitable for use in a food product. Conveniently, NAOH may be used; preferably in solution. The concentration of the NaOH in solution is conveniently about 25% to 50% by weight. As an alternative to injecting the alkali into the primary emulsion 10, the alkali may be added into the mixer 8 along with the water 4 and additive mixture 6. As a further alternative, the alkali may be injected into the primary emulsion 10 as it enters the emulsion mill 14.

The emulsion mill 14 is a high speed mill which subjects the emulsion to rapid mechanical heating and shearing. Any suitable emulsion mill 14 may be used, for example the emulsion mill disclosed in U.S. Pat. No. 5,132,137, the disclosure of which is incorporated by reference. Other suitable emulsion mills 14 are commercially available under the tradename of Trigonal and may be obtained from Siefer Machinenfabrik GmbH & Co KG, Bahnhofstrasse 114, Postfach 101008, Velbert 1, Germany. These emulsion mills usually comprise a pair of plates which are closely spaced apart. One of the plates rotates at high speeds. The emulsion is fed between the plates and the mechanical energy imparted to the emulsion rapidly raises its temperature. The heated emulsion 16 leaves the emulsion mill in a thin stream which packs onto earlier streams to form layers or striations The temperature of the primary emulsion 10 is raised to the desired coagulation temperature in the emulsion mill 14 in a few seconds. For example, the temperature may be raised to from about 100° C. to about 120° C. Alternatively, the temperature may be raised to in the range of about 45° C. to about 75° C. as described in U.S. Pat. No. 5,132,137. Usually the mechanical energy generated in the emulsion mill 14 will be sufficient to heat the emulsion 10 but this may be supplemented by the injection of superheated steam.

The heated emulsion 16 leaving the emulsion mill 14 is then transferred to a holding tube 18. Holding tubes 18 such as described in U.S. Pat. Nos. 4,781,939 and 5,132,137 may be used. In the holding tube 18, the heated emulsion 16 coagulates while moving slowly along the holding tube 18. The residence time of the heated emulsion 16 in the holding tube 18 is sufficient for the emulsion to have coagulated into a firm emulsion product upon reaching the exit of the holding tube 18. Residence times of about 30 seconds to about 10 minutes are sufficient; the actual time depending upon the temperature to which the primary emulsion 10 was heated. Longer or shorter residence times may also be used but disadvantages arise. If desired, the holding tube may be equipped with a suitable valve at its end to maintain a desired pressure in it.

The firm emulsion product 20 leaving the holding tube 18 is then transferred to a cutter 22 where it is cut into chunks 24 of size suitable for use in a pet food. Alternatively, if it is desired to produce chunks of a more natural appearance, steam may be intermittently injected into the holding tube 18 to cause disruption of the firm emulsion product 20 into chunks as it leaves the holding tube 18. This procedure is described in U.S. Pat. No. 4,781,939.

If desired, the chunks 24 may be baked by passing them through an oven as described in U.S. Pat. No. 5,132,137. However, if the meat emulsion 10 was heated to above 100° C. in the emulsion mill 14, this is unnecessary.

The chunks 24 are then allowed to cool and are collected. If desired, the collected chunks are stored for later use or are simply transferred to a canning operation. Prior to canning, the chunks 24 may be flaked if desired. In the canning operation, the chunks are filled into cans along with a gravy or sauce. The gravy or sauce may contain an acid, such as citric acid or phosphoric acid, which is acceptable in foods to neutralize the alkaline in the chunks. The cans are then sealed and sterilized. In this case, the product produced is a chunk-in-gravy type product. Alternatively the chunks may be combined with a meat emulsion which forms a loaf-type product. In this case, the meat emulsion may contain a similar acid to neutralize the chunks. The cans are then sealed and sterilized. In this case, the product produced is a chunk-in-loaf type product.

The chunks 24 have a highly striated appearance which provides a very good simulation of meat. This greatly increases the consumer acceptability of the product. Also, the chunks 24 have a chewy texture which requires the animals to chew them; much as animals would chew fresh meat. This offers the advantage of being beneficial to the animals' teeth.

Although the invention has been described with reference to pet foods, it will be appreciated that the process may also be used to produce foods intended for human consumption.

EXAMPLE 1

An emulsion is formed by mixing 20% plasma, 20% whey powder, 6% tallow, and 52% water (the percentages being based on the total weight of the chunk ingredients). The emulsion is transferred to a batch blender and 2% of a solution containing 50% by weight of NaOH is added. The pH of the emulsion increases to about 11.

The emulsion is run through an emulsion mill (a Trigonal Mill obtained from Siefer Machinenfabrik GmbH & Co KG). The emulsion leaving the emulsion mill is at a temperature of 103° to 105° C. and is discharged into a holding tube. The residence time in the holding tube is less than 6 minutes. The coagulated emulsion leaving the holding tube is cut into chunks of about 10 mm size. The chunks have a highly striated, meat-like appearance. Some meat-like browning, due to Maillard reactions between amino acids in the plasma and sugars in the whey, is noticeable.

A loaf product mix is prepared from about 53% by weight of meat and meat by-products, about 44.5% water and about 2.5% flavoring agents. The mixture is cooked in a batch mixer/cooker and filled, with the chunks, into cans. The mass ratio of loaf ingredients to chunks is about 78:22. The cans are sealed and sterilized.

A can is opened, a representative sample of the product is taken and the pH is determined to be about 6.5 to 7.0. Further product is fed to dogs and is freely eaten.

EXAMPLE 2

Chunks are produced as described in example 1. A gravy is then prepared by mixing together 5.5% starch, 1% phosphoric acid, less than 0.5% condiments, and water making up the remainder (all percentages being by weight). The chunks and gravy are combined in a mass ratio of about 45:55 and filled into cans. The cans are sealed and sterilized.

A can is opened, a representative sample of the product is taken and the pH is determined to be about 6.3 to 6.6. Further product is fed to dogs and is freely eaten.

EXAMPLE 3

Frozen meat and meat by-products obtained from a local source are ground and then emulsified. An emulsion mixture is then formed by mixing 2% plasma, 2% whey powder, 1% condiments and 93% emulsified meat and meat by-products (the percentages being based on the total weight of the chunk ingredients). The emulsion mixture is transferred to a batch blender and 2% of a solution containing 50% by weight of NaOH is added. The pH of the emulsion mixture increases to about 11.

The emulsion mixture is run through an emulsion mill (a Trigonal Mill obtained from Siefer Machinenfabrik GmbH & Co KG). The emulsion leaving the emulsion mill is at a temperature of 103° to 105° C. and is discharged into a holding tube. The residence time in the holding tube is less than 6 minutes. The coagulated emulsion leaving the holding tube is cut into chunks of about 10 mm size. The chunks have a highly striated, meat-like appearance. Some meat-like browning, due to Maillard reactions between amino acids in the plasma and sugars in the whey, is noticeable.

A gravy is then prepared by mixing together 5.5% starch, 1% phosphoric acid, less than 0.5% condiments, and water; the water making up the remainder (all percentages being by weight). The chunks and gravy are combined in a mass ratio of about 45:55 and filled into cans. The cans are sealed and sterilized.

A can is opened, a representative sample of the product is taken and the pH is determined to be about 6.3 to 6.6. Further product is fed to cats and dogs and is freely eaten.

EXAMPLE 4

Frozen meat and meat by-products obtained from a local source are ground and then emulsified. The emulsion is placed in a blender and 10% by weight wheat gluten, 4% by weight soy protein concentrate, 3% condiments and 18% by weight water are added to provide an emulsion mixture (the percentages being based on the total weight of all chunk ingredients). Two % by weight of a solution containing 50% by weight of NaOH is added then added and the emulsion mixture blended until uniform. The pH of the emulsion mixture increases to about 12.

The emulsion mixture is run through a Trigonal emulsion mill and discharged into a holding tube at a temperature of about 110° C. to about 115° C. The holding tube is equipped with a pinch valve to maintain back pressure. The coagulated emulsion leaving the holding tube is cut into chunks of about 10 mm size. The chunks have a shredded, stringy, meat-like appearance.

A gravy is then prepared by mixing together 2.5% starch, 0.5% condiments, 0.3% hydrocolloid, and water; the water making up the remainder (all percentages being by weight on the basis of gravy ingredients). The chunks and gravy are combined in a mass ratio of about 60:40 and then about 1.75% by weight of phosphoric acid is added and blended in. The mixture is then filled into cans. The cans are sealed and sterilized.

EXAMPLE 5

An emulsion is prepared by blending 8% by weight wheat gluten, 22% by weight soy protein concentrate, 0.3% condiments 5% fat and 62.7% by weight water (the percentages being based on the total weight of all chunk ingredients). Two % by weight of a solution containing 50% by weight of NaOH is added then added and the emulsion mixture blended until uniform. The pH of the emulsion mixture increases to about 11.

The emulsion is then formulated into chunks and added to a gravy as described in example 4.

EXAMPLE 6

A chunk produced according to the process described in U.S. Pat. No. 4,781,939 (Sample A) and a chunk produced according to example 4 (Sample 1) are frozen at −80° C. The samples are freeze fractured into sections of 10 to 15 μm and stained with Sudan III and Harris' Hematoxylin (*J Dairy Science;* 1922, 5). The samples are then subjected to light microscopy in the frozen state.

Sample 1 is formed of thin layers or striations of protein and fat generally of thickness less than about 50 μm. Sample A is formed of less well defined layers or striations of protein and fat of thickness substantially generally greater than 50 μm. The results support the visual observation that the chunks of Sample 1 have an appearance more highly striated then the conventional chunks of Sample A.

EXAMPLE 7

A dough which contains about 62.5% by weight of a mixture of turkey meat and fish is prepared according to example 4 (without the formation of chunks). The dough is labeled Sample 2. A similar dough is produced according to the process described in U.S. Pat. No. 4,781,939 (again without the formation of chunks). The dough is labelled Sample B. The doughs are then cut into disks of about 50 mm diameter and 10 mm thickness. Twenty disks of sample 2 are prepared in this way and 20 disks of sample B.

Each sample disk is placed in a texture analyzer (TX.XT2 by Texture Technologist Corp. Scarsdale, N.Y., USA) on a flat disk of 80 mm. The temperature is about 10° to 15° C. A flat bottom probe of 56 mm diameter is pressed down at a constant speed of 2 mm/s on the sample disk using 10 gram force and for a distance of 6 mm. The probe is held in this position for 60 seconds. The strain at the start of the pressing (initial strain) and the strain after pressing (final strain) are determined and recorded. The percentage elasticity recovery of each disk is then determined according to the formula:

recovery %=100−((final strain−initial strain)/final strain×100)

The results are as follows:

| | Sample 2 | | | | Sample B | | |
|---|---|---|---|---|---|---|---|
| Disk | Final strain | Initial strain | % Recovery | Disk | Final strain | Initial strain | % Recovery |
| 1 | 1402 | 887 | 63.3 | 1 | 812 | 223 | 27.5 |
| 2 | 1475 | 943 | 64.0 | 2 | 763 | 208 | 27.2 |
| 3 | 838 | 519 | 62.0 | 3 | 543 | 136 | 25.0 |
| 4 | 443 | 272 | 61.4 | 4 | 829 | 233 | 28.1 |
| 5 | 308 | 196 | 63.8 | 5 | 810 | 213 | 26.3 |
| 6 | 610 | 389 | 63.7 | 6 | 1011 | 288 | 28.5 |
| 7 | 930 | 583 | 62.7 | 7 | 781 | 216 | 27.6 |
| 8 | 953 | 579 | 60.7 | 8 | 616 | 168 | 27.3 |
| 9 | 493 | 309 | 62.7 | 9 | 799 | 200 | 25.1 |
| 10 | 501 | 314 | 62.7 | 10 | 771 | 217 | 28.2 |
| 11 | 462 | 285 | 61.7 | 11 | 755 | 207 | 27.4 |
| 12 | 356 | 222 | 62.0 | 12 | 509 | 140 | 27.5 |
| 13 | 683 | 429 | 62.7 | 13 | 821 | 212 | 25.8 |

-continued

| Disk | Sample 2 Final strain | Initial strain | % Recovery | Disk | Final strain | Initial strain | Sample B % Recovery |
|---|---|---|---|---|---|---|---|
| 14 | 425 | 260 | 61.2 | 14 | 532 | 141 | 26.6 |
| 15 | 492 | 307 | 62.4 | 15 | 672 | 181 | 27.0 |
| 16 | 87 | 53 | 60.7 | 16 | 538 | 151 | 28.0 |
| 17 | 801 | 489 | 61.1 | 17 | 843 | 229 | 27.2 |
| 18 | 1253 | 771 | 61.5 | 18 | 695 | 180 | 25.8 |
| 19 | 911 | 567 | 62.2 | 19 | 682 | 184 | 27.0 |
| 20 | 325 | 194 | 59.6 | 20 | 524 | 142 | 27.0 |

The average % recovery for the disks of sample 2 is 63.3 while that for the disks of sample B is 27.0. This indicates that chunks produced from the dough of Sample 2 have a much more elastic (chewier) texture than the conventional chunks.

We claim:

1. A process for the production of a formulated emulsion product which has a meat-like appearance, the process comprising:
   emulsifying a protein source for providing an emulsion;
   adding alkali to the emulsion to raise the pH to above 8;
   rapidly heating and comminuting the emulsion using mechanical energy for causing protein in the heated emulsion to at least partially coagulate;
   allowing the heated emulsion to coagulate and form striations; and
   forming the coagulated emulsion into chunks for providing a formulated emulsion product.

2. A process according to claim 1 in which NaOH, KOH or $Ca(OH)_2$, or mixtures thereof, is added as the alkali.

3. A process according to claim 2 in which sufficient alkali is added to raise the pH of the emulsion to a range of about 9 to about 12.

4. A process according to claim 1 in which the alkali is added to the emulsion during emulsification of the protein source.

5. A process according to claim 1 in which the alkali is added to the emulsion immediately prior to the heating and comminuting of the emulsion.

6. A process according to claim 1 in which the alkali is added to the emulsion during the heating and comminuting of the emulsion.

7. A process according to claim 1 in which up to about 60% by weight, on the basis of the weight of the emulsion, of moisture is emulsified with the protein source for providing a formulated emulsion product having a moisture content of about 45% to 85% by weight.

8. A process according to claim 1 in which the emulsion is rapidly heated and comminuted by forcing the emulsion between a pair of spaced-apart plates at least one of which is rotating at high speed.

9. A process according to claim 8 in which the emulsion is heated to a temperature in the range of about 102° C. to about 120° C.

* * * * *